(12) United States Patent
Denzel et al.

(10) Patent No.: US 11,865,692 B2
(45) Date of Patent: Jan. 9, 2024

(54) MAGNETIC BASE

(71) Applicant: C. & E. Fein GmbH, Schwaebisch Gmuend-Bargau (DE)

(72) Inventors: Sergej Denzel, Schwaebisch Gmuend (DE); Stefan Scherrenbacher, Waldstetten (DE)

(73) Assignee: C. & E. Fein GmbH, Schwaebisch Gmuend-Bargau (DE)

( * ) Notice: Subject to any disclaimer, the term of this patent is extended or adjusted under 35 U.S.C. 154(b) by 128 days.

(21) Appl. No.: 17/220,583

(22) Filed: Apr. 1, 2021

(65) Prior Publication Data
US 2021/0308858 A1 Oct. 7, 2021

(30) Foreign Application Priority Data

Apr. 1, 2020 (DE) .................... 20 2020 101 776.4

(51) Int. Cl.
| | | |
|---|---|---|
| *B23B 45/14* | (2006.01) | |
| *B25H 1/00* | (2006.01) | |
| *B28D 1/14* | (2006.01) | |
| *B23Q 3/15* | (2006.01) | |

(52) U.S. Cl.
CPC ........... *B25H 1/0071* (2013.01); *B28D 1/146* (2013.01); *B23B 2260/10* (2013.01); *B23Q 3/15* (2013.01)

(58) Field of Classification Search
CPC ... B25H 1/0071; H01F 5/04; H01F 2007/062; H01F 27/306; H01F 27/325
See application file for complete search history.

(56) References Cited

U.S. PATENT DOCUMENTS

| | | | | |
|---|---|---|---|---|
| 3,254,547 A | * | 6/1966 | Engelsted | B25H 1/0071 408/712 |
| 3,609,616 A | | 9/1971 | Dumeige | |
| 3,796,506 A | * | 3/1974 | Buck | B25H 1/0071 408/76 |

(Continued)

FOREIGN PATENT DOCUMENTS

| | | |
|---|---|---|
| DE | 1539757 A1 | 5/1971 |
| DE | 2053493 B2 | 3/1974 |

(Continued)

OTHER PUBLICATIONS

Machine translation of DE 1539757 (Year: 1971).*

*Primary Examiner* — Alan Snyder
(74) *Attorney, Agent, or Firm* — Muncy, Geissler, Olds & Lowe, P.C.

(57) ABSTRACT

A magnetic base for an electric machine tool, in particular for a magnetic core drilling machine. A body that is accommodated in a receiving space. At least one first magnet coil constituting an electromagnet, a coil winding of the at least one first magnet coil being wound on a bobbin and a magnetic force of which is switchable between a maximum resultant holding force and a minimum resultant holding force. The coil winding of the magnet coil has two end sections that are each connected to a connecting cable that serves to make electrical contact between the magnetic coil and the electric machine tool. The body has a first side adapted to be coupled to the electric machine tool and has an opposite second side adapted to be placed on a workpiece that is to be processed. End sections of the coil winding are connected to the connecting cables.

16 Claims, 7 Drawing Sheets

(56) References Cited

U.S. PATENT DOCUMENTS

| | | | | |
|---|---|---|---|---|
| 4,122,424 A | * | 10/1978 | Plunkett | H01F 5/04 336/107 |
| 4,122,425 A | | 10/1978 | Hughes | |
| 4,591,301 A | | 5/1986 | Pelfrey | |
| 6,181,230 B1 | * | 1/2001 | Broome | H01F 5/02 336/208 |
| 2005/0225418 A1 | | 10/2005 | Tran-Ngoc et al. | |
| 2015/0251284 A1 | * | 9/2015 | Reichert | B25H 1/0071 408/76 |
| 2018/0053595 A1 | * | 2/2018 | Elliott | H01F 41/127 |

FOREIGN PATENT DOCUMENTS

| | | |
|---|---|---|
| DE | 3543143 A1 | 6/1986 |
| DE | 202011103538 U1 | 11/2011 |
| DE | 202013011818 U1 | 7/2014 |

\* cited by examiner

MAGNETIC BASE

This nonprovisional application claims priority under 35 U.S.C. § 119(a) to German Patent Application No. 20 2020 101 776.4, which was filed in Germany on Apr. 1, 2020 and which is herein incorporated by reference.

BACKGROUND OF THE INVENTION

Field of the Invention

The present invention relates to a magnetic base for an electric machine tool, in particular for a magnetic core drilling machine, having a body in which is accommodated in a receiving space at least one first magnet coil constituting an electromagnet, the coil winding of which is wound on a bobbin and the magnetic force of which is switchable between a maximum resultant holding force and a minimum resultant holding force, wherein the coil winding of the magnet coil has two end sections that are each connected to a connecting cable that serves to make electrical contact between the magnetic coil and the electric machine tool, and wherein the body has a first side that can be coupled to the electric machine tool and has an opposite second side that can be placed on a workpiece that is to be processed.

Description of the Background Art

Magnetic bases have long been known from the prior art and are customarily used to attach electric machine tools, such as magnetic core drilling machines, by magnetic holding force to the workpiece that is to be processed.

However, it has proven disadvantageous here that the connecting cables are customarily soldered to the end sections of the coil winding. Yet this procedure is quite complicated and is disadvantageous in that it has turned out not to have high process reliability. Thus, in this process the end sections of the coil windings must first be freed of the insulation that is applied to the coil wire, wherein it is necessary to ensure that the same length is always stripped. After that, the respective ends are soldered to one another, and the solder joint is covered and protected with so-called heat-shrink tubing. But even the soldering itself is subject to the problem that it is generally carried out by hand, and thus can only be carried out with limited reproducibility. Moreover, the finished solder joint can be subjected to only a limited mechanical load, not least because of the small diameter of the coil wire of the magnet coil.

SUMMARY OF THE INVENTION

It is therefore an object of the present invention to provide an improved magnetic base that can be manufactured more simply and with higher process reliability. It is an additional object of the invention to provide an improved electric machine tool.

The part of the object relating to the magnetic base is attained according to the invention in a magnetic base of the aforementioned type by the means that the end sections of the coil winding are each connected to the connecting cables by a mechanical connection aid.

The mechanical connection aid achieves the result that the end sections of the coil windings and the connecting cables can be connected to one another reliably and, above all, reproducibly, thus reducing the aforementioned disadvantages and thereby simultaneously improving process reliability.

In this context it has then proven worthwhile when the connection aid is selected from a group that includes crimp connectors, in particular splices and wire end ferrules, and parallel connectors. In crimping, a connecting element, often made of metal, is used with which two components are connected to one another through plastic deformation of the connecting element, for example through clinching, squeezing, pinching together, or folding. If this connecting element is designed as a splice, then the material from which the splice is made is implemented as splice band and is stored on a roll. In a splicing machine or else in an upstream step, a prefabricated length of the splice band is then cut off. One of the end sections of the coil windings and one of the connecting cables are now placed on this splice, after which the splice is plastically deformed. This plastic deformation is performed by the splicing machine. This process can, of course, also be performed manually, for example using pliers. The procedure is similar when wire end ferrules are used. One of the end sections of the coil winding in each case and one of the connecting cables can be inserted into the wire end ferrule. This wire end ferrule can be deformed and compressed at least locally, for example by pliers, which typically are designed specifically for compressing wire end ferrules. These types of connection connect the two cables located in the crimp connector to one another to form a unit. Moreover, the use of such crimp connectors makes it possible to dispense with stripping the end sections of the coil winding, since the insulating lacquer coating located on the coil wire is cut locally by the compression of the crimp connector. As a result, the coil wire is then connected in an electrically conductive manner to the connecting cable through the crimp connector. Alternatively, parallel connectors can also be used, which have a cylindrical tubular section in which the cables are accommodated. This tubular section is then likewise mechanically deformed in order to connect the cables securely to one another and make electrical contact between them.

In this context, it has then also proven worthwhile when the connecting cable and the end section of the coil winding have a common insertion direction in the connection aid. This results in very simple work preparation, since the connecting cable and the end section need only be inserted together into the connection device from the same direction.

In order to securely support the connection aid, it has proven advantageous when a receptacle for the connection aids is associated with the bobbin. The connection aids can be inserted into these receptacles after the end sections of the coil windings and the connecting cables have been securely connected to one another by the connection aid to form a unit. Provision is also made within the scope of the invention in this case that the connection aids are accommodated in the receptacle in a frictional and/or interlocking manner. A snap-in connection can be used for this purpose, for example.

It has also proven especially advantageous when the receptacle includes two receiving compartments that are electrically insulated from one another. The electrical insulation ensures that a short circuit between the connection aids in the installed state is prevented. Moreover, additional insulation is provided by this means, which has a beneficial effect for use of the magnetic base according to the invention. This measure then ensures that the necessary air gaps and creepage distances can be maintained. This is further promoted when the length of the connection aids is less than the insertion depth of the receptacle. It is also ensured by this means that the connection aid is accommodated fully in the receptacle, so that the risk of a short circuit due to protrusion of the connection aid from the receptacle is reduced.

The insertion of the connection aid is further facilitated when the receptacle extends toward the first side of the body. As a result, during assembly the connection aid can be inserted simply into the receptacle, and the connecting cable can be routed simply to the hand-operated machine tool.

In this context, it has also proven worthwhile when a wire guide is formed on the outside of the receptacle. It is consequently possible to ensure that the end sections of the coil winding run from the actual magnet coil to the receptacle in a guided manner when the connection aid is inserted into the receptacle. In this context, it has then also proven advantageous when the wire guide includes a first section, which extends over a side face of the receptacle, and a second section, which is formed on an end face of the receptacle.

It has also proven especially beneficial when the bobbin has a first side plate, which faces the first side of the body, and a second side plate, which faces the second side of the body, wherein the first side plate and the second side plate are connected to one another by a cylindrical section on which the coil winding of the magnet coil is wound. As a result of this construction of the bobbin, it is possible to ensure that the magnet coil can be wound reliably on the cylindrical section. In this context, it has then proven worthwhile, moreover, when the receptacle is associated with the first side plate, which is arranged next to the first side of the body. The first and the second side plates run parallel to the first side of the body in this case.

The insulation of the magnet coil accommodated in the receiving space from the body surrounding it can also be further improved, in particular, by the means that the receptacle and/or the side plate and/or the bobbin is made of an electrically insulating material.

It has also been shown to be advantageous when multiple notches are formed on the edge of the first side plate, since the guidance of the end sections of the coil winding is improved still further by this means. In this context it has further proven to be advantageous when exactly three notches are formed. In this way, one of the notches can be used during coil winding of the magnet coil to guide one of the end sections therein, namely the starting end section, then to secure the starting end section on the first side plate, and after that to begin the winding process.

It has also proven especially beneficial when the magnet coil in the receiving space is encapsulated by an electrically insulating potting compound. In addition to improved insulation, the position of the magnet coil in the receiving space is also secured by this means, which has a beneficial effect on the service life of the magnetic base.

The object relating to the electric machine tool is attained by an electric machine tool having a magnetic base according to the present invention.

The subject matter of the invention is also an improved manufacturing method for a magnetic base, which includes the following steps: placing a coil winding on a bobbin to create a magnet coil; joining one end section of the coil winding in each case and a connecting cable in a mechanical connection aid, which preferably is designed as a crimp connector; forming a unit composed of the end section of the coil winding, the connecting cable, and the crimp connector by deforming the connection aid; inserting the units that include the end section of the coil winding, the connecting cable, and the deformed connection aid into a receptacle that is formed on the bobbin; inserting the magnet coil into a body of the magnetic base; and encapsulating the magnet coil in the body with a potting compound.

An especially simple manufacturing method for a magnetic base is provided by this means, wherein provision is also made within the scope of the invention that multiple magnet coils are used, each of which is preferably accommodated in its own receiving space in the body of the magnetic base.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
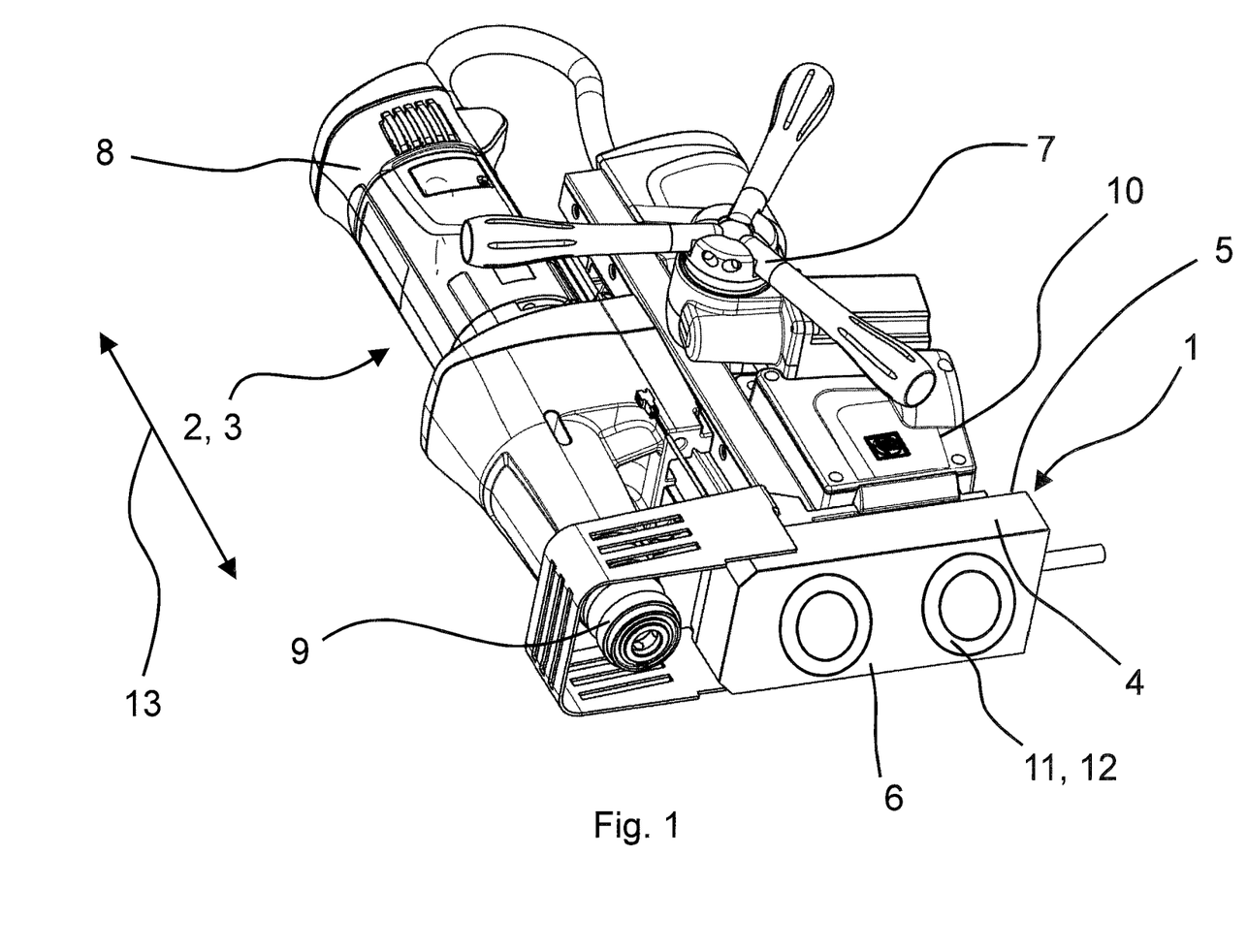
FIG. 1 is a perspective view of a magnetic base, which is attached to an electric machine tool.

In a perspective view, FIG. 1 shows a magnetic base 1, which is attached to an electric machine tool 2, in the present example to a magnetic core drilling machine 3. The magnetic base 1 in this case has a body 4 with a first side 5, which is coupled to the electric machine tool 2, and with an opposite second side 6, which can be placed on a workpiece that is to be processed. A drive motor 8, with which a toolholder 9 is coupled in a rotationally fixed manner, can be adjusted relative to the magnetic base 1 and an electronics unit 10 connected thereto, as indicated by the arrow 13, by means of a manually operated adjusting mechanism 7. To attach the electric machine tool 2 to a workpiece, the tool is placed on a magnetizable workpiece by means of the second side 6 of the magnetic base 1, and the magnetic base 1 is switched on. For this purpose, magnet coils 11, each of which constitutes an electromagnet 12, as explained in further detail below, are arranged in the body 4 of the magnetic base 1.

Figure 2:
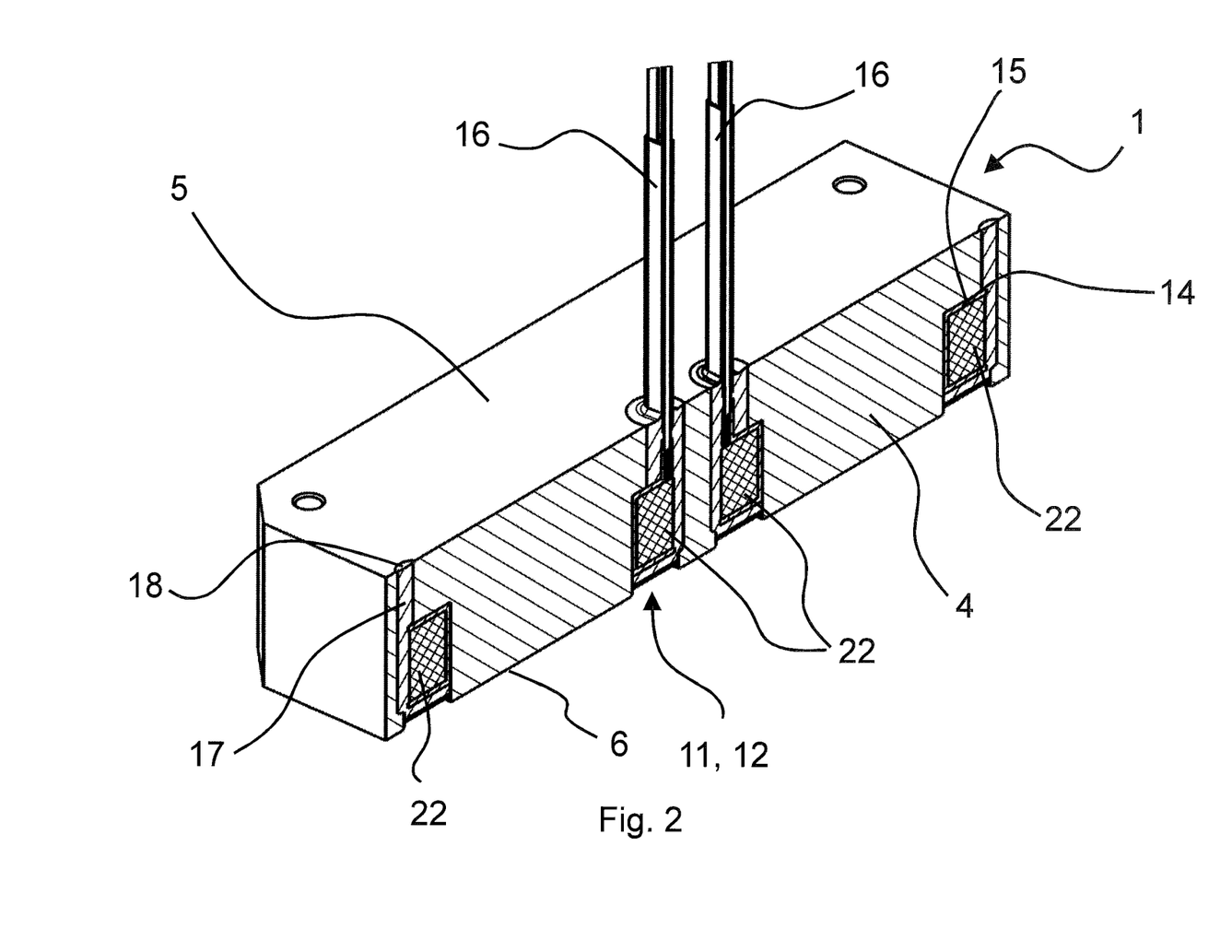
FIG. 2 is a longitudinal section through a first embodiment of a magnetic base.

FIG. 2 shows the construction of the magnetic base 1 in a sectional view along a longitudinal section. As is evident from FIG. 2, the magnetic base 1 has a body 4 in which two magnet coils 11, which constitute the electromagnets 12 of the magnetic base 1, are accommodated in receiving spaces 14. The coil windings 22 of the magnet coils 11 are each wound on a bobbin 15 that is accommodated in the receiving space 14 formed in the body 4. The magnet coils 11 are connected in an electrically conductive manner to the electric machine tool 2 by connecting cables 16 in this design.

As a result, it is possible for the user to control the magnet coils 11 and thereby to switch the magnetic force of the electromagnets 12 between a maximum resultant holding force and a minimum resultant holding force. The magnet coils 11 in the respective receiving spaces 14 in this design are encapsulated by an electrically insulating potting compound 17 in order to achieve additional insulation of the magnet coils 11 from the body 4. To supply the potting compound 17, feed channels 18, into which the potting compound 17 can be introduced and which open into the receiving spaces 14, are formed in the body 4.

Figure 3:
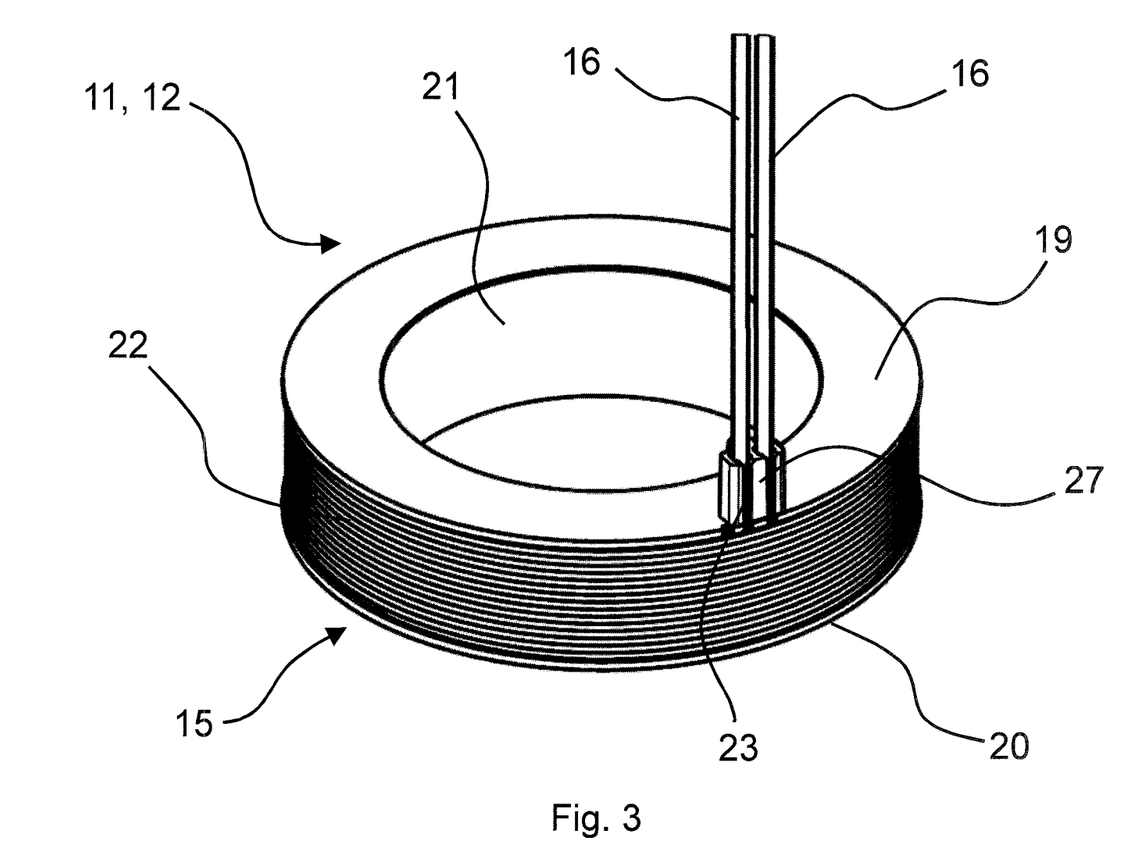
FIG. 3 is a perspective view of a magnet coil of the magnetic base.

The construction of the magnet coil 11 is made clear by the perspective view shown in FIG. 3, in particular. Thus it can be seen that the bobbin 15 has a first side plate 19, which faces the first side 5 of the body 4, and a second side plate 20, which faces the second side 6 of the body 4. The first side plate 19 and the second side plate 20 are connected to one another by a cylindrical section 21 on which the coil winding 22 of the magnet coil 11 is wound.

Figure 4:
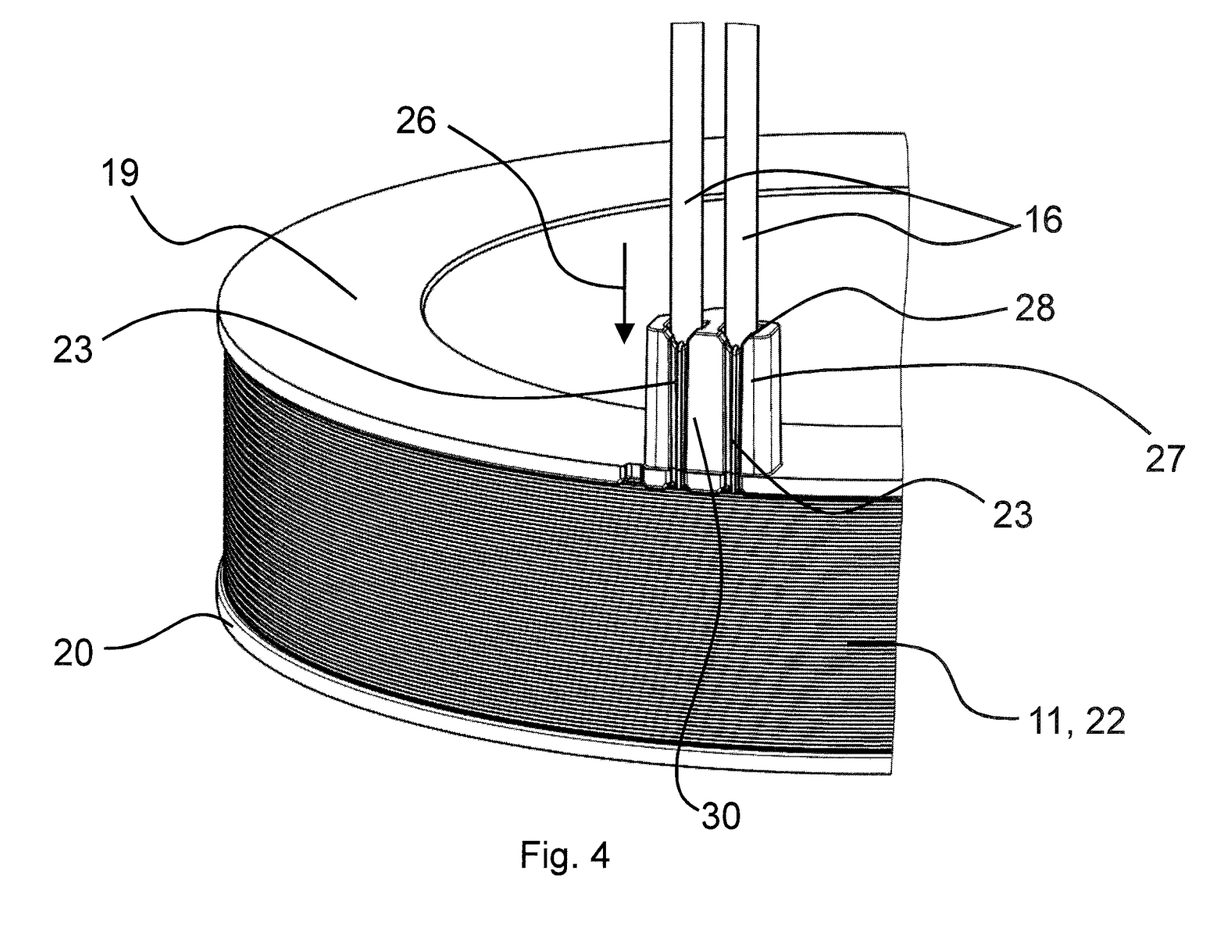
FIG. 4 is a view of a detail from FIG. 3.

As is evident from the detail view shown in FIG. 4, in particular, the coil winding 22 of the magnet coil 11 has two end sections 23 that are each connected to one of the connecting cables 16 that serve to make electrical contact between the magnetic coil 11 and the electric machine tool 2. These end sections 23 of the coil winding 22 are each connected to the connecting cables 16 by a mechanical connection aid 24, which is designed in the exemplary embodiment shown as a crimp connector 25, and specifically as a splice. During this process, the connecting cable 16 and the end section 23 of the coil winding 22 are pushed into the connection aid 24 in a common insertion direction 26—which is to say in the direction of the arrow shown in FIG. 4—before the crimp connector 25 is mechanically compressed and thus connected to form a unit. The end sections 23 and connecting cable 16 connected into a unit by the crimp connector 25 are each accommodated in a receptacle 27 that is associated with the bobbin 15, specifically with the first side plate 19, and that extends toward the first side 5 of the body 4.

Figure 5:
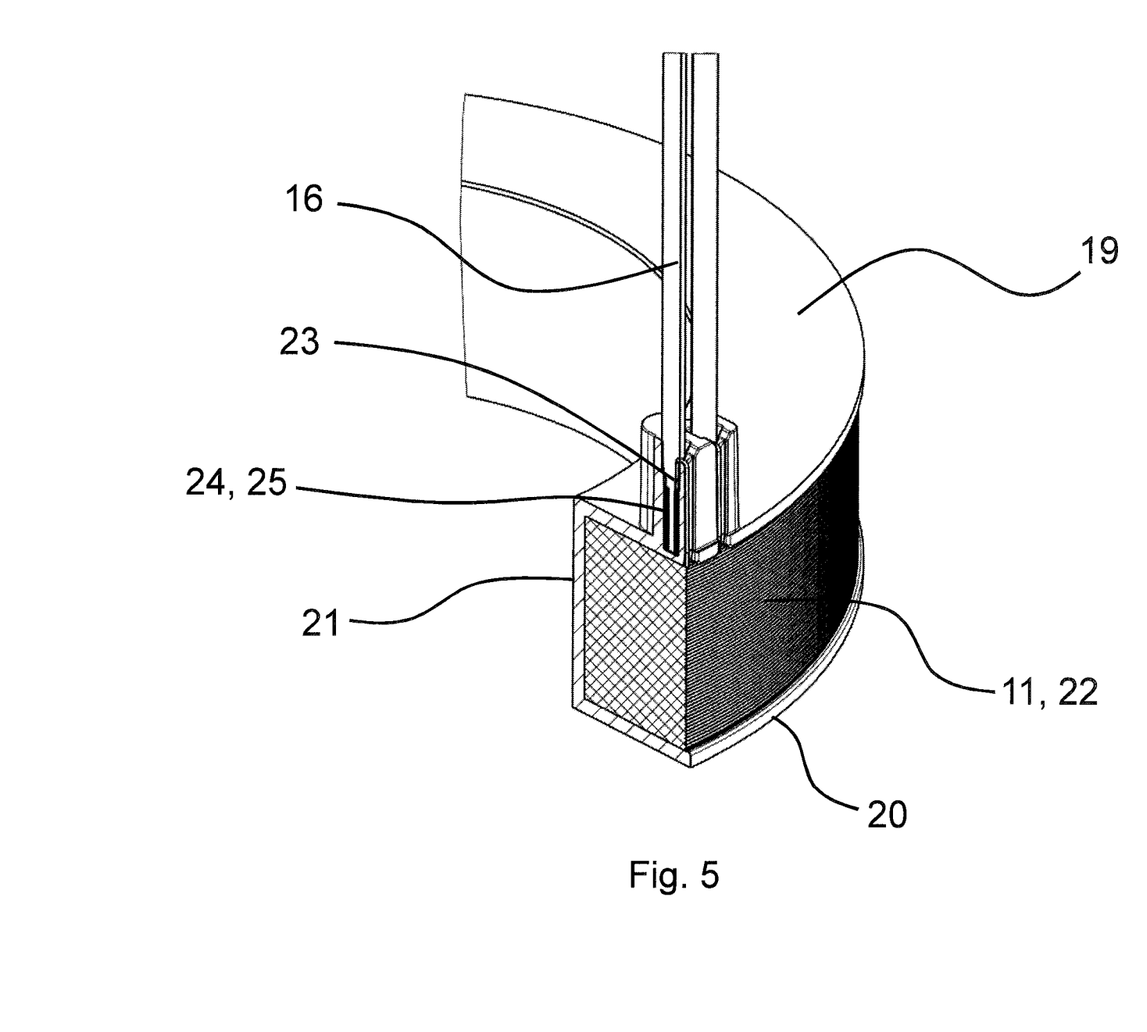
FIG. 5 is a sectional view through the magnet coil from FIG. 3.

In a sectional view, FIG. 5 shows, in particular, the unit that is accommodated in the receptacle 27 and is composed of end section 23 of the coil winding 22 and connecting cable 16, which are permanently connected to one another by the crimp connector 25. It is additionally evident from FIG. 5 that the receptacle 27 is closed at one end, by which means the insertion depth of the connection aid 24 in the receptacle 27 is limited. The crimp connector 25 is dimensioned such that its length is less than the insertion depth of the receptacle 27 in this design. It is ensured by this means that the unit inserted into the receptacle 27, which unit comprises the end section 23 of the coil winding 22 and the connecting cable 16, is accommodated in the receptacle 27 in such a manner that the risk of short circuits is prevented effectively.

Figure 6:
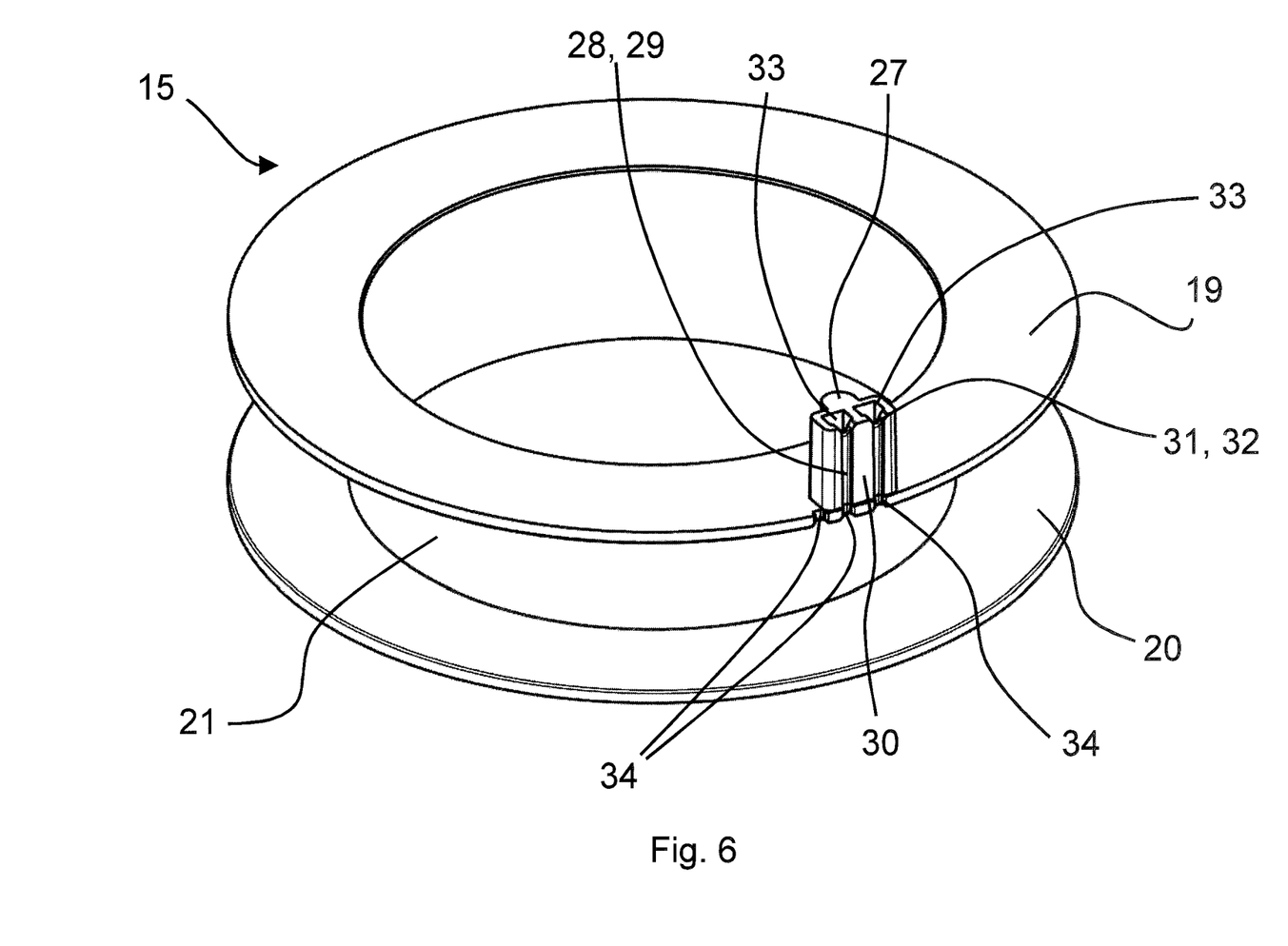
FIG. 6 is a perspective view of a bobbin.

FIG. 6 shows a perspective view of the bobbin 15, which, in the exemplary embodiment shown, is made of an electrically insulating material, namely of plastic, and which is made to be highly thermally conductive and electrically insulating in the exemplary embodiment shown. It is evident from this illustration that a wire guide 28, in which the end sections 23 of the coil winding 22 are guided, is formed on the outside of the receptacle 27. In this design, this wire guide 28 includes a first guide section 29, which extends over a side face 30 of the receptacle 27, and a second guide section 31, which is formed on an end face 32 of the receptacle 27. The first guide section 29 is designed to be perpendicular to the second guide section 31 in this case. In particular, FIG. 6 also shows, however, that the receptacle 27 includes two receiving compartments 33 that are electrically insulated from one another in order to electrically insulate the two crimp connectors 25, and thus also the two end sections 23 inside the receptacle 27, from one another. Formed on the edge of the first side plate 19 are three notches 34, of which two notches 34 run in alignment with the wire guides 28. The third notch 34, which is shown at the far left in FIG. 6, is used during the winding process to guide the beginning of the end section 23, which is attached to the first side plate 19, for example in a holding device or by means of adhesive tape.

Figure 7:
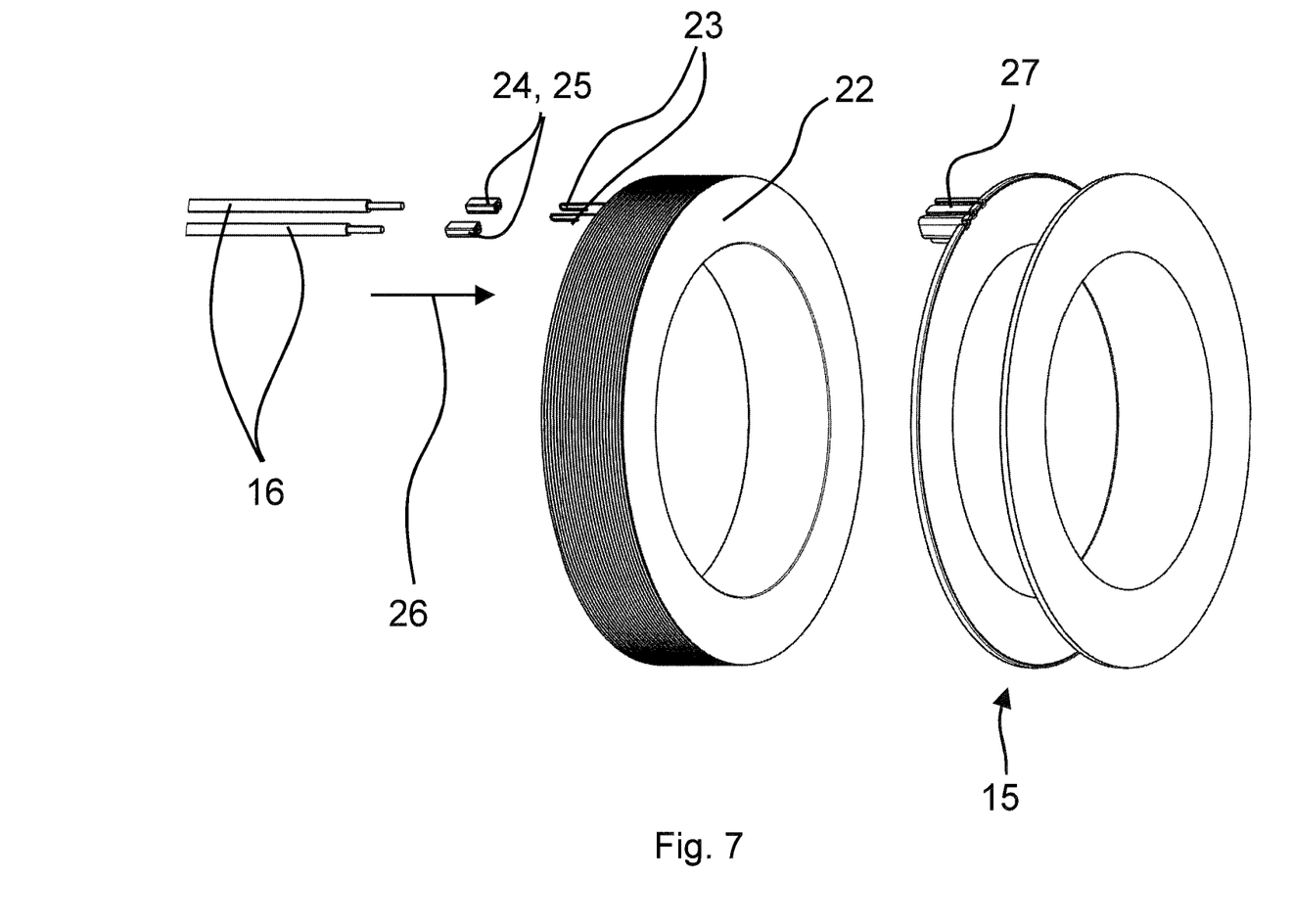
FIG. 7 is an exploded view of the magnet coil.

FIG. 7 shows the magnet coil 11 in an exploded view. This view makes it clear once again that the end sections 23 of the coil winding 22 that come from the magnet coil 11 are bent back such that they can be guided into the crimp connector 25 from the same direction as the connecting cables 16.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A magnetic base for an electric machine tool, the magnetic base comprising:
   a body; and
   at least one first magnet coil constituting an electromagnet that is accommodated in a receiving space of the body, a coil winding of the at least one first magnet coil being wound on a bobbin and a magnetic force of which is switchable between a maximum resultant holding force and a minimum resultant holding force,
   wherein the coil winding of the at least one first magnet coil has two end sections that are each connected to a respective one of connecting cables that serve to make electrical contact between the at least one first magnet coil and the electric machine tool,
   wherein the body has a first side adapted to be coupled to the electric machine tool and has an opposite second side adapted to be placed on a workpiece that is to be processed,
   wherein the two end sections of the coil winding are each connected to the respective one of the connecting cables by a mechanical connection aid,
   wherein the connecting cables and the two end sections of the coil winding have a common insertion direction in the mechanical connection aid, and
   wherein the mechanical connection aid is disposed inside of the body.

2. The magnetic base according to claim 1, wherein the mechanical connection aid is selected from a group that includes crimp connectors, splices, wire end ferrules or parallel connectors.

3. The magnetic base according to claim 1, wherein a receptacle that is associated with the bobbin is provided for the mechanical connection aid.

4. The magnetic base according to claim 3, wherein the receptacle includes two receiving compartments that are electrically insulated from one another.

5. The magnetic base according to claim 4, wherein each of the two receiving compartments of the receptacle are closed at one end.

6. The magnetic base according to claim 3, wherein a length of the mechanical connection aid is less than an insertion depth of the receptacle.

7. The magnetic base according to claim 3, wherein the bobbin has a first side plate, which faces the first side of the body, and a second side plate, which faces the second side of the body, wherein the first side plate and the second side plate are connected to one another by a cylindrical section on which the coil winding of the at least one first magnet coil is wound, and
  wherein the receptacle protrudes from a surface of the first side plate of the bobbin, the surface facing the first side of the body, such that the receptacle extends toward the first side of the body.

8. The magnetic base according to claim 3, wherein a wire guide is formed on the outside of the receptacle.

9. The magnetic base according to claim 8, wherein the wire guide includes a first guide section, which extends over a side face of the receptacle, and a second guide section, which is formed on an end face of the receptacle.

10. The magnetic base according to claim 3, wherein the bobbin has a first side plate, which faces the first side of the body, and a second side plate, which faces the second side of the body, wherein the first side plate and the second side plate are connected to one another by a cylindrical section on which the coil winding of the at least one first magnet coil is wound.

11. The magnetic base according to claim 10, wherein the receptacle is associated with the first side plate, which is arranged next to the first side of the body.

12. The magnetic base according to claim 11, wherein the receptacle and/or the first side plate and/or the bobbin is made of an electrically insulating material.

13. The magnetic base according to claim 10, wherein a plurality of notches are formed on an edge of the first side plate.

14. The magnetic base according to claim 13, wherein exactly three notches are formed.

15. The magnetic base according to claim 1, wherein the at least one first magnet coil in the receiving space is encapsulated by an electrically insulating potting compound.

16. An electric machine tool comprising a magnetic base according to claim 1.

* * * * *